United States Patent Office 3,364,482
Patented Jan. 16, 1968

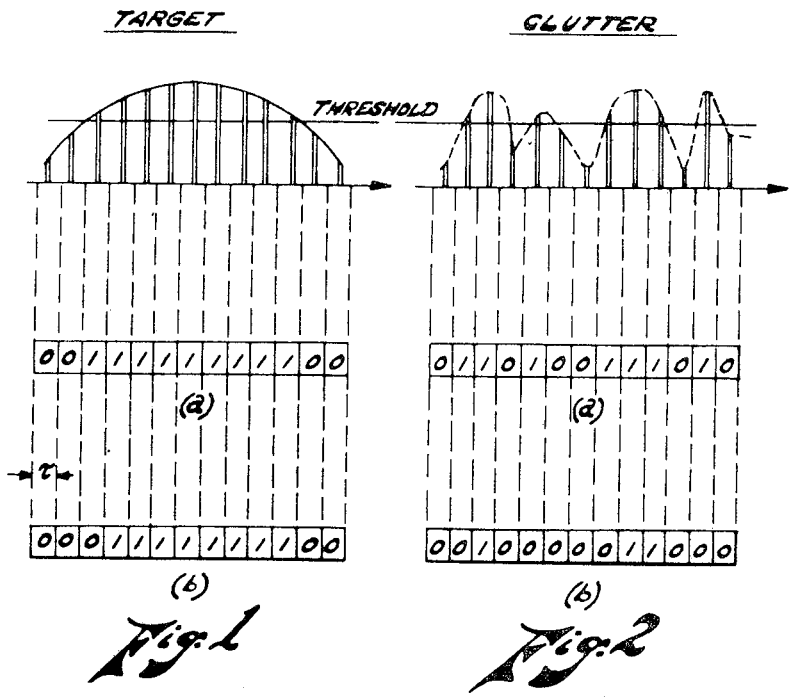
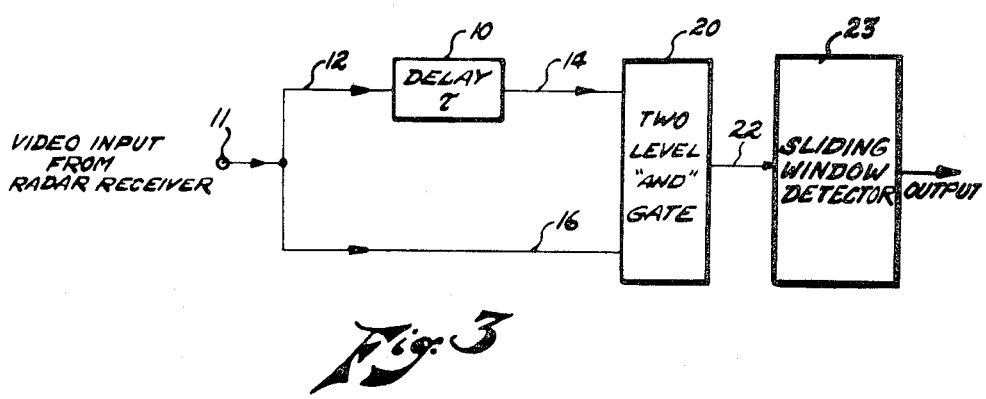

3,364,482
APPARATUS FOR REDUCING RADAR WEATHER
RETURNS BY COINCIDENCE DETECTION
William K. Sones, Baltimore, Md., assignor, by mesne assignments, to the United States of America as represented by the Secretary of the Air Force
Filed Dec. 9, 1966, Ser. No. 600,670
1 Claim. (Cl. 343—5)

ABSTRACT OF THE DISCLOSURE

A pulse radar system including a scanning antenna and receiver with means for reducing the effects of pulse returns produced by weather on pulse returns produced from true targets responsive to regular amplitude modulation from true target pulse returns caused by the antenna scanning pattern and having a coincidence detector and sliding window detector for providing true target indication.

This invention relates to scanning radar systems of the type wherein pulse returns produced by a "true" target are distinguished from pulse returns produced by a "weather" target.

More particularly, this invention relates to apparatus for reducing the effects of weather on scanning radar systems wherein all of the pulse returns are fed into a system comprising a coincidence detector and a sliding window detector.

One prior art method of reducing the effects of weather returns is to pass the pulse return signals through a logarithmic amplifier followed by utilizing a fast time constant (or equivalently a high pass filter), and thereby take advantage of the difference in spectral composition of the returns. However, the disadvantage of this type of circuit is that it only operates on the analog differences in the returns.

Accordingly, a primary object of this invention is to provide apparatus for reducing the effects of weather on radar which will distinguish returns caused by weather from those returns caused by an aircraft or point target.

Another object of this invention is to provide coincidence detection and sliding window apparatus in combination with a scanning radar system whereby the effects of weather on radar returns are reduced.

Still another object of this invention is to provide in combination with a scanning radar system apparatus utilizing the effect of antenna modulation produced by a true target to distinguish pulse returns from true targets from weather returns.

And still another object of this invention is to provide improved apparatus in combination with a scanning radar system whereby the detection criterion used to distinguish true targets can be changed dynamically in accordance with the density of the clutter environment.

To the accomplishment of the foregoing objects, the instant invention comprehends the utilization of a sliding window detector preceded by a coincidence detector. The invention utilizes the fact that returns from a point target form an unbroken finite pulse train, the amplitude of which is modulated by the antenna scanning pattern. However, returns not subjected to this regular modulation are the returns from distributed targets (weather), namely, those targets whose dimensions are large compared with the antenna beamwidth. The coincidence detector requires that two consecutive pulses be present, spaced by the pulse repetition frequency delay time before a hit is stored on a data processing drum. By introducing coincidence detection before a sliding window detector, an unbroken train of pulses, representative of a true target, is enhanced over a pulse train with random occurrence.

Other objects, features and advantages of the invention and the manner of obtaining them will become more apparent and the invention itself will be best understood, by reference to the following description of an embodiment of the invention taken in conjunction with the accompanying drawings, wherein:

FIGURE 1 shows data appearing in the sliding window detector from a target with and without coincidence detection;

FIGURE 2 shows data appearing in the sliding window detector from clutter with and without coincidence detection; and FIGURE 3 is a block diagram of a simple coincidence detector.

Now referring to FIGURES 1 and 2, the simplified diagrams show typical data stored for the two types of return, one with scanning modulation, the other without. The returns from a point target form an unbroken pulse train, whose amplitude is modulated by the antenna scanning pattern. The returns from clutter, however, are not subject to this regular modulation. In order to recognize or extract this scanning modulation, a sliding window detector preceded by a coincidence detector is used. Parts (a) of FIGURES 1 and 2 show the data appearing in the sliding window detector from both target and clutter when no coincidence detection is used. It is evident that if a criterion is taken that at least six of the possible twelve range boxes must register "hits" before a "target present" decision is made, then from parts (a) of FIGURES 1 and 2 both true target and clutter will be decided as targets. However, the clutter is rejected, as shown by parts (b) of FIGURES 1 and 2 when the same stored data is first processed by the coincidence detector shown in FIGURE 3.

In FIGURE 3, the coincidence detector comprises a two level "And" gate having two inputs, 14 and 16, which are connected to a video terminal 11 of the radar receiver by parallel paths having delay times that differ by the delay between pulses having the pulse repetition frequency of the radar. Before output 22 to the sliding window detector 23 is generated, namely, before a "hit" is stored on the data processing drum, the coincidence detector requires that two consecutive pulses be present, spaced by the pulse repetition frequency delay $\tau$. In parts (b) of FIGURES 1 and 2 the same stored data shown in parts (a) of FIGURES 1 and 2, is shown after having been first processed by the coincidence detector. It can be seen that if the same criterion is used, namely that at least six of the range boxes must register "hits" before a "target present" decision is made, the true targets is accepted whereas the clutter is now rejected.

Accordingly, from the foregoing description, it will be seen that the present invention provides a simple, practical, highly reliable and economical system for reducing the effects of weather on a radar system.

Therefore, while the invention has particularly been shown and described with reference to a preferred embodiment thereof, it will be understood by those skilled in the art that various changes in form and details may be made therein without departing from the spirit and scope of the invention.

I claim:
1. In combination with a pulse radar system including a scanning antenna and a receiver, means for reducing the effects of pulse returns produced by weather on pulse returns produced from true targets responsive to regular amplitude modulation from true target pulse returns and irregular modulation from weather pulse returns caused by the antenna scanning pattern comprising a coincidence detector consisting of an "And" gate having two parallel input paths connected to the video output of the radar receiver and a delay means in one of the input paths for causing a delay equal to the pulse repetition frequency of the video signal input to the delay means; and a sliding window detector connected to the output of the coincidence detector.

References Cited

UNITED STATES PATENTS

| | | | |
|---|---|---|---|
| 3,091,763 | 5/1963 | Mortley et al. | 343—7.7 X |
| 3,109,171 | 10/1963 | Henry et al. | 343—7.7 |
| 3,312,969 | 4/1967 | Halsted | 343—5 |
| 3,281,838 | 10/1966 | Morris et al. | 343—7.3 X |
| 3,047,857 | 7/1962 | Rockett et al. | 343—6.5 |

RICHARD A. FARLEY, *Primary Examiner.*

RODNEY D. BENNETT, *Examiner.*

C. L. WHITHAM, *Assistant Examiner.*